United States Patent
van der Rijn

(10) Patent No.: US 8,984,280 B2
(45) Date of Patent: Mar. 17, 2015

(54) SYSTEMS AND METHODS FOR AUTOMATING CERTIFICATION AUTHORITY PRACTICES

(75) Inventor: Daniel J. G. van der Rijn, San Carlos, CA (US)

(73) Assignee: TIBCO Software Inc., Palo Alto, CA (US)

( * ) Notice: Subject to any disclaimer, the term of this patent is extended or adjusted under 35 U.S.C. 154(b) by 1048 days.

(21) Appl. No.: 11/675,987

(22) Filed: Feb. 16, 2007

(65) Prior Publication Data

US 2008/0201575 A1 Aug. 21, 2008

(51) Int. Cl.
*H04L 9/00* (2006.01)
*H04L 9/32* (2006.01)
*H04L 29/06* (2006.01)

(52) U.S. Cl.
CPC .............. *H04L 9/3263* (2013.01); *H04L 9/321* (2013.01); *H04L 63/0823* (2013.01)
USPC ........................................................ 713/156

(58) Field of Classification Search
CPC ......... H04L 9/32; H04L 9/321; H04L 9/3263; H04L 9/3268; H04L 63/0823; H04L 63/12
USPC .................... 713/156, 160, 161, 175; 726/5, 6
See application file for complete search history.

(56) References Cited

U.S. PATENT DOCUMENTS

| | | | |
|---|---|---|---|
| 5,982,898 A | 11/1999 | Hsu et al. | |
| 6,035,402 A | 3/2000 | Vaeth et al. | |
| 6,308,277 B1 * | 10/2001 | Vaeth et al. | 726/10 |
| 6,314,521 B1 * | 11/2001 | Debry | 726/10 |
| 6,427,071 B1 * | 7/2002 | Adams et al. | 455/403 |
| 6,535,978 B1 * | 3/2003 | Padgett et al. | 713/156 |
| 6,636,975 B1 * | 10/2003 | Khidekel et al. | 726/10 |
| 6,775,782 B1 | 8/2004 | Buros et al. | |
| 2003/0074555 A1 * | 4/2003 | Fahn et al. | 713/156 |
| 2003/0084290 A1 * | 5/2003 | Murty et al. | 713/168 |
| 2003/0115475 A1 | 6/2003 | Russo et al. | |
| 2003/0212892 A1 * | 11/2003 | Oishi | 713/168 |
| 2005/0076198 A1 * | 4/2005 | Skomra et al. | 713/156 |
| 2005/0229004 A1 | 10/2005 | Callaghan | |
| 2005/0246292 A1 * | 11/2005 | Sarcanin | 705/67 |
| 2008/0022103 A1 * | 1/2008 | Brown et al. | 713/175 |
| 2008/0076525 A1 * | 3/2008 | Kim | 463/22 |

OTHER PUBLICATIONS

Gilligan, Robert E., and Erik Nordmark. "Transition mechanisms for IPv6 hosts and routers." Transition (2000).*
PCT/US08/053198, Search Report and Written Opinion of International Searching Authority mailed Jul. 18, 2008.
EP 08729182, Supplementary European Search Report dated Oct. 19, 2012.

* cited by examiner

*Primary Examiner* — Andrew W Johns
(74) *Attorney, Agent, or Firm* — Baker & McKenzie LLP

(57) ABSTRACT

Systems and methods for efficiently verifying identities and for generating and signing digital certificates associated with those identities are disclosed. Generation of a digital certificate of an entity may begin by receiving a certificate signing request from the entity at a certification authority, the certificate signing request including verification information. The certificate signing request may be transmitted to a registration authority and the information of the certificate signing request may be processed. Whether to approve the certificate signing request may be determined, based on a result of the processing, and an approval may be granted when the certificate signing request is approved. A certificate associated with the entity may be generated when the approval is received, and the certificate may be transmitted to the entity.

33 Claims, 2 Drawing Sheets

SYSTEMS AND METHODS FOR AUTOMATING CERTIFICATION AUTHORITY PRACTICES

FIELD

The present application relates to systems and methods for automating certification authority practices, and more particularly to systems and methods for efficiently verifying identities and for generating and signing digital certificates associated with those identities.

BACKGROUND

Encryption is commonly used to protect communication information by rendering it unreadable to a recipient lacking the resources necessary to decrypt it. Modern digital encryption methods include symmetric key algorithms ("private-key" algorithms) and asymmetric key algorithms ("public-key" algorithms).

In a private-key algorithm, a sender of communication information and a recipient of that information must each use a common, shared key that has been agreed upon in advance and kept secret from all other parties. The sender uses this key for encryption of the information, and the receiver uses the same key for decryption of the received information.

In contrast, in a public-key encryption system two separate keys, commonly called a "key pair," are utilized for communicating information: a public key and a private key. The public key is published and freely distributed to other entities, and enables any sender to encrypt information to the public key's owner. A corresponding private key is maintained in secret by the receiver, and enables only the receiver to decrypt and read information that has been encrypted with the public key. Therefore the public-key method allows the sender and receiver to communicate securely without having prior access to a common, shared secret key.

A key is a piece of information that controls the operation of a cryptographic algorithm by specifying the particular transformation of unencrypted information into encrypted information, and vice-versa during decryption. The public and private keys are mathematically related, for instance each may be created through the use of a key pair generation function utilizing a random number as an input. In a robust and effective cryptographic system, derivation of the private key from the public key should be computationally infeasible.

Public-key cryptography may be used for several purposes, such as keeping a confidential message secret from any entity that does not possess a specific private key, as a message encrypted using the receiver's public key can only be decrypted by the receiver's corresponding private key. Public-key cryptography may also allow for a key agreement between two entities without an initially shared secret key to agree on one. Furthermore, a public key digital signature may be used to allow any entity to verify that a message was created with a specific private key.

Public-key digital signature algorithms may also be used for sender authentication and non-repudiation. For instance, a first entity may encrypt a message with its private key and send it. If a second entity can successfully decrypt it using the corresponding public key, this provides assurance that the first entity, in fact, sent it.

One crucial element of public-key cryptography is the accurate and dependable association of entity identities with the public keys distributed to other entities. However, securely exchanging keys directly amongst a large number of entities who do not know each other is cumbersome and impractical. Therefore, large-scale public-key systems utilize certificates as a way to efficiently associate public keys and entities.

Digital signatures may be used in public key infrastructure ("PKI") systems in which a public key is associated with an entity by a digital identity certificate issued by a certificate authority ("CA"). Such a system enables multiple communicating parties to establish confidentiality, message integrity, and user authentication without having to exchange any secret information prior to the communication.

A conventional certificate may include public key information, entity identification information, information describing a period of validity of the certificate, and the digital signature of the certificate. The entity identification information may include, for example, name information, address information, location information, phone number information, and the like. The identification information may be associated with a natural person, or with a computer, organization, or other entity. In addition, the certificate may include information identifying a location of a revocation center, for instance in the form of a uniform resource locator ("URL").

As an example of the use of certificates, in a public-key system, an entity ("entity A") need only publish a public key ("public key A") to allow any other party possessing public key A ("entity B") to send information to entity A securely, as described above. However, a malicious entity ("entity M") is also able to publish a public key and falsely identify it as belonging to entity A. Such an action would allow entity M to at least receive and read some information sent to entity A under the erroneous belief that public key M actually belongs to entity A.

Therefore, to defend against such a malicious scheme, entity A may embed public key A into a certificate, and have that certificate digitally signed by a trusted third party. Any entity that trusts the trusted third party can therefore check the certificate to see whether the trusted third party asserts that the embedded public key belongs to entity A. In a conventional PKI system, the trusted third party may correspond to a CA that is tasked with verifying relationships between entities and their public keys, and that is trusted by all entities within the system. Multiple CAs may be utilized, and the multiple CAs may be organized into a hierarchy whereby different CAs possess differing quantities of authority.

For instance, conventional enterprise-scale PKI systems may rely on certificate chains to establish a party's identity, as a certificate may have been issued by a CA whose legitimacy is established for such purposes by a certificate issued by a higher-level CA. Therefore the certificate hierarchy may include several CAs and/or several organizations, and may require cooperation and communication between several different interoperating software applications.

The CA may also be responsible for revoking certificates when the private key corresponding to the certificate's public key is compromised, or when the relationship between an entity and the entity's public key embedded in the certificate is discovered to be incorrect or changes. Validity of certificates may be checked by an entity by comparing it against a certificate revocation list ("CRL") that contains identification information of revoked and/or cancelled certificates.

PKI systems therefore enable users to be authenticated to one another, and to use the public keys embedded in identity certificates to encrypt and decrypt messages traveling between them. A conventional PKI system may include client software, server software such as a certificate authority, hardware, and operational procedures. PKI systems may be operable for several functions, including providing and managing public keys and bindings to entity identities used for encryption and/or sender authentication of electronic mail messages or other documents, authentication of users to applications, bootstrapping secure communication protocols, and the like.

The accurate association of public keys is crucial to the correct and secure operation of such a system. As described above, however, such association of identities may require a significant expenditure of resources and may involve a significant amount of subjective judgment on the part of the trusted third party. Accordingly, such association in a conventional PKI system is performed in accordance with highly sophisticated protocols and policies used to establish and verify the associations.

Updating and maintaining accuracy of the CRL is another crucial function in a conventional PKI system, and typically requires significant expenditure of resources and finances. To be effective, it must be readily available to an entity that requires it, and must be updated frequently. Additionally, since validity of keys is central to the proper function of the system, revocation authority over keys carries significant responsibility. Accordingly, the mechanism to maintain security of the revocation functions and for revocation of keys and maintenance of the revocation list requires significant labor, capital, and time resources.

In addition to maintenance of the hierarchical CA structure and of the revocation mechanism described above, validation of identity in a conventional PKI system may be time-consuming, expensive, and costly. For instance, identity verification may include performance of in-person interviews, analysis of subscriber enrollment forms, checking validity of notarization, signatures, and attestations, and archiving of evidence of the exercise of due diligence in validating certificate information. Procedures followed by CAs may be outlined in a document such as a Certification Practices Statement ("CPS"). A link to the CPS of a CA may be included in certificates signed by the CA.

As will be understood by one skilled in the art, performance of these activities and maintenance of adequate records and evidence trails may prove to be extremely resource-intensive and costly.

There are many applications for PKI systems where a very high level of trust in identity is not required. With respect to these applications, the high costs associated with identity verification and maintenance described above may outweigh the benefits available through the PKI system itself.

Accordingly, a need exists for systems and methods for efficiently and cost-effectively verifying identities to allow creation of certificates and the exchange of public keys in a PKI system, while avoiding the above-identified disadvantages.

SUMMARY

An aspect of the present application provides for a method for generating a digital certificate of an entity, comprising receiving, at a certification authority, a certificate signing request from the entity, the certificate signing request including public key information of the entity, identification information of the entity, and verification information, transmitting the certificate signing request to a registration authority, processing, at the registration authority, information of the certificate signing request, determining whether to approve the certificate signing request based on a result of the processing, transmitting an approval to the certification authority when the certificate signing request is approved, generating a certificate associated with the entity when the approval is received by the certification authority, and transmitting the certificate to the entity, wherein the verification information includes at least one of shared secret information, information embedded within a network transmission protocol wrapper, network address information, device identification information, or location information.

A further aspect of the present application provides for a method for generating a digital certificate, comprising receiving, at a certification authority, a certificate signing request from an entity, the certificate signing request including public key information of the entity, identification information of the entity, and verification information, transmitting the certificate signing request to a registration authority, receiving an approval from the registration authority, generating a certificate associated with the entity when the approval is received, and transmitting the generated certificate to the entity, wherein the verification information includes at least one of shared secret information, information embedded within a network transmission protocol wrapper, network address information, device identification information, or location information.

A further aspect of the present application provides for a method for approving a digital certificate signing request of an entity, comprising receiving, at a registration authority, a certificate signing request of the entity from a certification authority, the certificate signing request including public key information of the entity, identification information of the entity, and verification information, processing the information of the certificate signing request, determining whether to approve the certificate signing request based on a result of the processing, and transmitting an approval to the certification authority when the certificate signing request is approved, wherein the verification information includes at least one of shared secret information, information embedded within a network transmission protocol wrapper, network address information, device identification information, or device location information.

A further aspect of the present application provides for a method for obtaining a certificate associated with an entity, comprising providing identification information of the entity, generating key information, the key information including private key information and public key information, storing the private key information, generating a certificate signing request, the certificate signing request including at least the public key information, the identification information of the entity, and verification information, transmitting the generated certificate request to a certificate authority, and receiving a signed certificate, wherein the verification information includes at least one of shared secret information, information embedded within a network transmission protocol wrapper, network address information, device identification information, or location information.

BRIEF DESCRIPTION OF THE DRAWINGS

Embodiments of the present application are illustrated by way of example in the accompanying figures, in which like reference numbers indicate similar elements, and in which.

DETAILED DESCRIPTION

The exemplary embodiments of the present application relate to systems and methods for efficiently verifying identities of entities requesting certificates and for generating and signing digital certificates.

Figure 1:
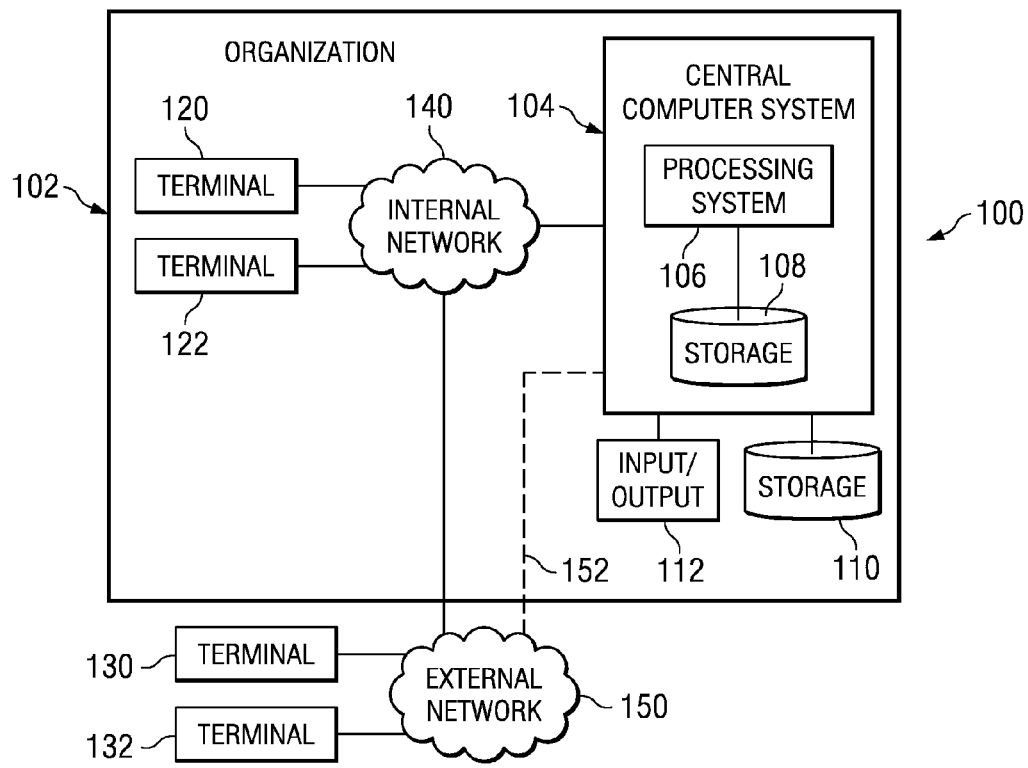
FIG. 1 shows a certificate authority system according to an exemplary embodiment of the application.

Referring to FIG. 1, an exemplary certificate authority system may include an organization 102 and a central computer system 104 of the organization 102. The central computer system 104 may include a processing system 106, an internal storage system 108, an external storage system 110, and one or more input/output devices 112. As will be understood by one skilled in the art, the input/output devices 112 may include computer peripheral devices, monitors, keyboards, mice, printers, and the like, operable for inputting information and instructions into the central computer system 104 and for receiving output from the central computer system 104.

The system 100 may include internal terminals 120-122, and external terminals 130-132. The internal terminals 120-122 and external terminals 130-132 may include any suitable computer devices capable of processing information and communicating with other terminals and with the central computer system 104, such as desktop computers, laptop computers, tablet computers, personal digital assistants, cellular communication devices, and the like. Although two internal terminals 120-122 and two external terminals 130-132 are shown in FIG. 1 for purposes of illustration, system 100 may include any suitable quantity of internal and external terminals.

An internal data communication network 140 may be operable for transmission of communication information between the internal terminals 120-122 and the central computer system 104, and an external data communication network 150 may be operable for communication between external terminals 130-132 and central computer system 104. External data communication network 150 may include a public data communication network such as the Internet, and may be connected with and may communicate with internal data communication network 140. Alternatively, internal data communication network 140 may be completely independent of external data communication network 150, whereby external terminals 130-132 may communicate with central computer system 104 via an independent data connection 152. The internal data communication network 140 and the external data communication network may include wired or wireless data communication networks, and may utilize any conventional network hardware, such as routers, switches, hubs, network interfaces, and the like.

As discussed above, in conventional PKI systems, certificates may be used to publish and distribute public keys by binding each public key to an identity. This binding may be accomplished through the use of a digital signature, and the digital signature may be provided by a trusted third-party, such as a CA.

Such a signature therefore operates as a form of attestation by the certificate signer that the public key and the identity information are properly associated. When the certificate signer is a trusted entity, and when the certificate signer's signature can be verified, then a party may also trust that the public key contained in the certificate is properly associated with the identity information.

In an exemplary embodiment of the present application, verification information may be associated with and/or included within a certificate signing request generated and/or sent by an entity desiring a certificate. The verification information may include, for instance, a shared secret such as a password or a random number secret.

Alternatively, the verification information may include information contained within a delivery mechanism associated with the transmission of the certificate signing request.

The delivery mechanism may include, for instance, the physical networking properties of a transmission protocol used to transmit the certificate signing request, logical networking properties of the transmission protocol, message envelopes, security infrastructure, and the like.

Such properties may be contributed, for example, by any one or more suitable layers (e.g., Layers 1-7) of the Open System Interconnection ("OSI") networking framework. Alternatively, such properties may be contributed by one or more other suitable networking frameworks.

These properties may include, for instance, information of an Internet Protocol ("IP") address, and the IP address information may be associated either with an absolute address or with a reverse domain name system ("DNS") lookup of IP address information. Other exemplary properties may include information associated with an IP network if through User Datagram Protocol ("UDP"), a TIBCO Rendezvous network (UDP), and an Internet Protocol Version 6 ("IPv6") network. Additional exemplary properties include information associated with a serial port, Bluetooth communication information, infrared communication ("IR") information, Radio Frequency Identification ("RFID") information, X.25 address information, cellular phone number information, Universal Serial Bus ("USB") device information, and/or information associated with any other suitable peripheral device.

In alternative exemplary embodiments, the peripheral devices may include, for instance, peripheral storage devices (e.g., optical media drive devices, flash drive devices, tape drive devices, floppy drive devices, smart card reading devices, punch card reading devices, etc.), peripheral reading devices (e.g., keyboard devices, pointing devices, joystick devices, touchscreen devices, devices, barcode readers, text and image scanning devices, speech recognition devices, fingerprint reading devices, brain-computer interface devices, etc.), or any combination thereof.

Exemplary physical properties may include properties of personal physical presence, and/or time parameters. In an exemplary embodiment, for instance, the verification information may include password information, whereby the password information is valid only for a predetermined period of time after issue.

Alternatively, the physical properties may be combined with the time parameters. In an exemplary embodiment, for instance, a connection may only be considered within a predetermined time window such as within business hours, on or within a period of time measured from a day of a month, and the like.

When a security infrastructure exists, the infrastructure itself may provide authorization. For instance, when an IPv6 network is utilized, a recipient may infer authorization by the authorization required to use the network itself.

The verification information may additionally include biometric information. The biometric information may include, for instance, information associated with physical characteristics such as fingerprint information, eye retina and eye iris information, facial pattern and hand measurement information, signature information, voice pattern information, and the like.

As will be understood by one skilled in the art, such information may be contributed through the use of any one or more of the exemplary devices and peripheral devices described above.

The certificate signing request may be sent by an entity, and the entity may include, for instance, a natural person, a computer device, a corporation, or any other suitable entity. The certificate signing request may be transmitted to the central computer system 104, and processed by a certification authority software application that may be stored in internal storage device 108 and/or external storage device 110, and run by processing system 106. Alternatively, the certification authority software application may be stored in, run, and/or administered by another computer system independent of the organization 102, and may communicate with central computer system 104 via one or both of the internal data communication network 140 or the external data communication network 150.

In an exemplary embodiment, the certification authority software application includes a registration authority software application that is run in association with the certification authority software application. Alternatively, the registration authority software application may be stored in, run, and/or administered by another computer system independent of the organization 102, and may communicate with central computer system 104 via one or both of the internal data communication network 140 or the external data communication network 150.

In an exemplary embodiment, for instance, the certification authority may perform functions such as signing certificates, as well as administrative functions such as certificate renewals, maintenance of CRLs, and the like, while the registration authority software application may perform functions associated with deciding whether to sign the certificates.

When the certification authority and/or registration authority software application is stored in, run, and/or administered by a computer system independent of the organization 102, communication with the independent computer systems may be performed utilizing secure communication protocols such as Secure Sockets Layer ("SSL").

Figure 2:
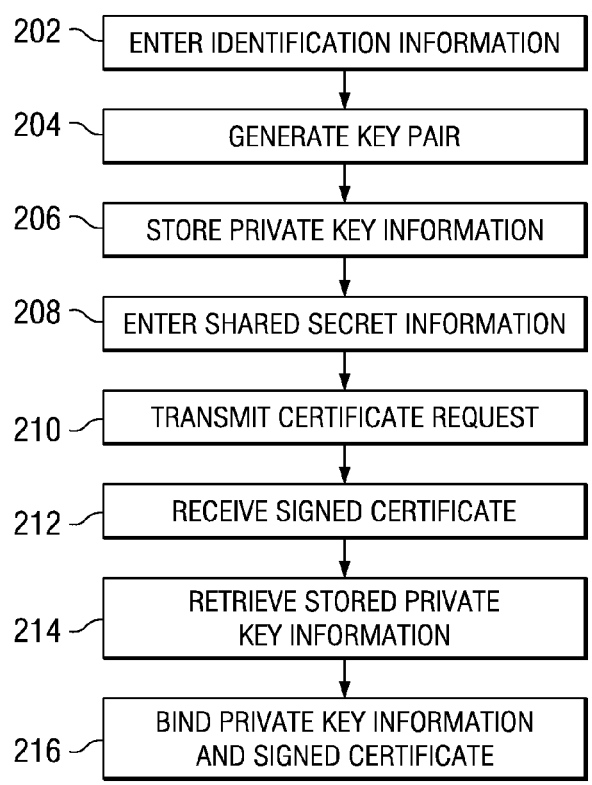
FIG. 2 is a flow diagram showing a process for obtaining a certificate according to an exemplary embodiment of the application.

A process for obtaining a certificate 200 according to an exemplary embodiment will be described with reference to FIG. 2.

At step 202, identification information of the entity may be entered. In an exemplary embodiment, the identification information may include, for instance, name information, address information, location information, telephone number information, email address information, and the like. The identification information may also include, for instance, machine name information (e.g., for web or other servers), electronic mail address information, and/or biometric information. The identification information may include any information sufficient to identify the entity.

A key pair may be generated at step 204. The key pair generation may include generation of a random number and input of the generated random number into a key pair creation software application, for instance in the form of embedded library code, resulting in the creation of private key information and public key information.

The private key information may be stored securely at step 206. The private key information may be stored, for instance, in a predetermined location on a storage device of the entity, such as a hard disk drive, removable flash storage medium, optical recording medium, smart card, and the like. Alternatively, the private key information may be stored in a portable secure storage device such as a smart card. The storage may include encrypting the private key information using a local password prior to storing it to the media.

Shared secret information may be entered at step 208, and the shared secret information may include a password, passphrase, or similar data. Alternatively, the shared secret information may include random number information, biometric information, and the like.

The shared secret information may be entered manually by an individual, for instance through the use of a keyboard or other suitable data input device, or may be automatically retrieved by a software application from a local or portable storage device.

The shared secret information may be combined and/or associated with the certificate signing request. In an exemplary embodiment, for instance, when HTTP basic authorization is used, the shared secret information may be inserted into the HTTP header, while the certificate signing request may be inserted into the body of the request.

After entry and combination of the shared secret information with the certificate signing request, the shared secret information and certificate signing request combination is transmitted to the certification authority software application, at step 210. The shared secret information may be transmitted along with the certificate signing request, as described above, or the shared secret information may be transmitted separately from the certificate signing request using a correlation identification. The certification request is processed by the certification authority and/or registration software application as described below.

Upon successful processing of the certification request, a signed certificate is received, at step 212. Thereafter, the private key information stored at step 206 is retrieved at step 214, and the retrieved private key information is bound together with the signed certificate to form an identity, at step 216.

Figure 3:
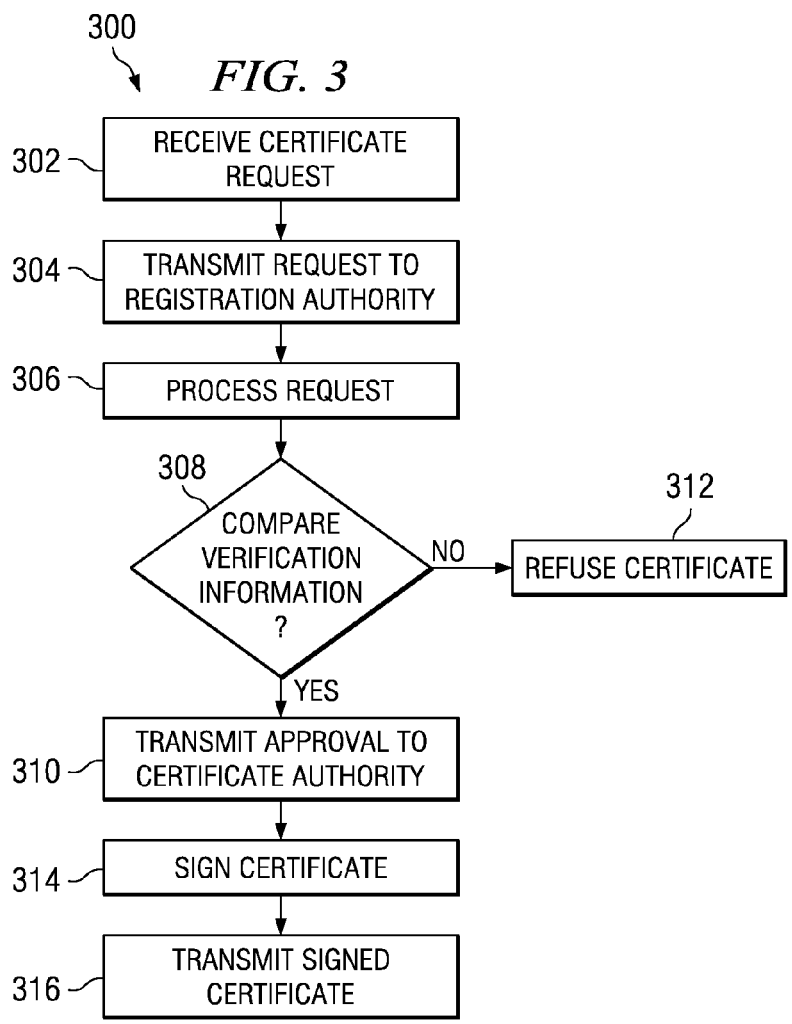
FIG. 3 is a flow diagram showing a process for generating a certificate according to an exemplary embodiment of the application.

A process for generating and signing a certificate 300 according to an exemplary embodiment is described below, with reference to FIG. 3.

A certificate signing request may be received by the certification authority software application, at step 302. After receipt of the certificate signing request, the certificate signing request may be transmitted to the registration authority software application, at step 304. In an alternative exemplary embodiment, the certification authority and registration authority functions may be performed by a single integrated software application.

After receipt, the certification signing request may be processed at step 306. The processing of step 306 may include analysis of the certificate signing request and/or extraction and analysis of verification information that is embedded within, transmitted with, and/or otherwise associated with the certificate signing request.

In an exemplary embodiment, for instance, the verification information may include shared secret information, as described above. The shared secret information of the certificate signing request may be analyzed, and compared with stored values at step 308. The stored value may be stored, for example, in internal storage device 108, external storage device 110, or in another suitable storage location.

In alternative exemplary embodiments, the verification information may include other types of information. For instance, the processing of step 306 may include analysis of verification information contained within a delivery mechanism used to transmit the certification request. For instance, the verification information may include an IP address of a device used to send the certificate signing request. The verification information may include a numerical IP address, or may include a domain name obtained by performing a reverse DNS lookup of the numerical IP address. The numerical IP address or resolved DNS domain name information may be analyzed, and compared with a stored value at step 308. The stored value may be stored, for example, in internal storage device 108, external storage device 110, or in another suitable storage location.

In an alternative exemplary embodiment, the verification information may include an identification of a network, device, software application, and/or communication system used to send the certificate signing request. For instance, the verification information may include an identification of a Java Message Service ("JMS") server, a firewall, or other software application used to transmit the certificate signing request, and/or another indication that some suitable form of authentication and/or authorization was performed at a time of transmission of the certificate signing request. The identification information may be analyzed, and compared with a stored value at step 308. The stored value may be stored, for example, in internal storage device 108, external storage device 110, or in another suitable storage location.

Sufficiency of the verification information may be determined, for instance, in accordance with the CPS, and the determination may include evaluation of the security properties of a computer and/or data communication system performing the communication.

In an alternative exemplary embodiment, the verification information may include information indicating that the certificate signing request was transmitted from a particular device or location, for instance from a device that was physically connected to a particular serial data communication line or other network connection. The device identification information or location information may be analyzed, and compared with a stored value at step 308. The stored value may be stored, for example, in internal storage device 108, external storage device 110, or in another suitable storage location.

When the comparison of step 308 indicates that the analyzed verification information matches valid corresponding stored values, an approval may be transmitted to the certification authority software application at step 310. When the comparison indicates that the analyzed verification information does not match valid corresponding stored values, the certificate signing request may be denied, and the process may end at step 312.

As will be understood by one skilled in the art, and as described above, the certification authority application and the registration authority application may include separate software applications, or may be integrated into a single application. Accordingly, the transmission of step 310 may include transmission between the certification authority application and the registration authority application when they include separate software applications, for instance via a data communication network. Alternatively, the transmission of step 310 may include a communication within an integrated single software application and/or a communication between modules of an integrated single software application.

When the approval is transmitted to the certification authority software application, the certificate authority software application may sign the certificate signing request into a certificate, at step 314.

Upon signing of the certificate, the signed certificate may then be transmitted to the entity, at step 316. Identification information of the certificate may additionally be stored by the CA, for instance by entry into a database at the CA.

Figure 4:
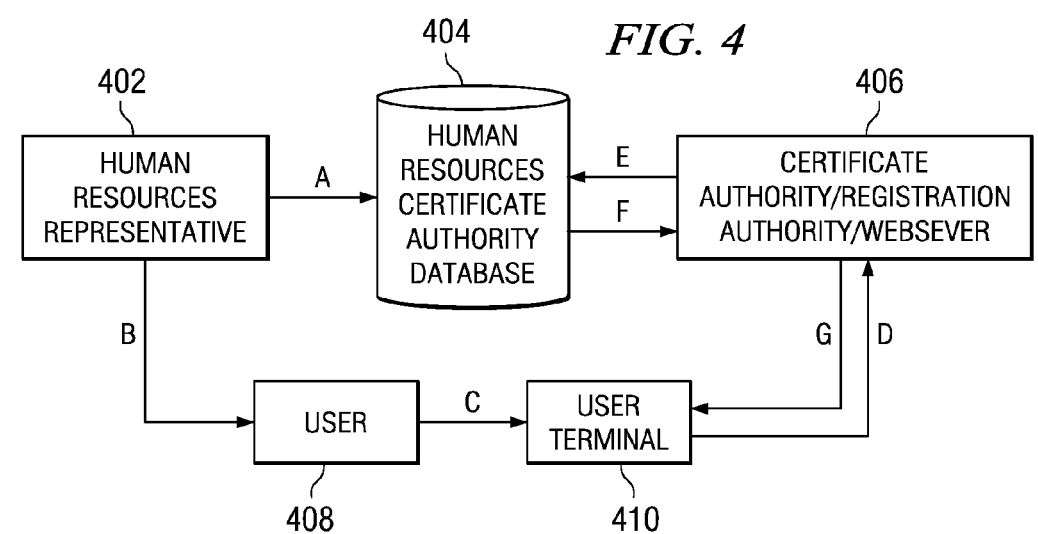
FIG. 4 is a schematic representation of a process for generating a certificate according to an exemplary embodiment of the application.

An exemplary process for generating a certificate will now be described with reference to the schematic diagram of FIG. 4.

In the activity labeled "A," a human resources representative 402 may enter username and password information into a human resources certificate authority database 404. In activity "B," the user 408 may be told the username and password information. The user 408 may be, for instance, a new employee.

In the activity labeled "C," the user may operate the user terminal 410 to create a new certificate signing request. The certificate signing request may be sent to the certificate authority/registration authority webserver 406, as shown in activity "D." The transmission of activity "D" may include the username and password information, and may be performed via a web and/or Internet connection with webserver 406. The transmission may include, for example, an HTTP communication whereby a HTTP header contains the username and password information and a body of the HTTP communication includes the certificate signing request.

The webserver 406 may then look up the username and password information corresponding to the user 408 and stored in the database 404, in activity "E." The webserver 406 may receive a response to the lookup in activity "F," and the webserver 406 may thereafter sign the certificate signing request and transmit a signed certificate to the user's terminal 410, at activity "G." As will be understood by one skilled in the art, the present application is not limited to the precise exemplary embodiments described herein and various changes and modifications may be effected without departing from the spirit or scope of the application. For example, elements and/or features of different illustrative embodiments may be combined with each other, substituted for each other, and/or expanded upon within the scope of the present disclosure and the appended claims. In addition, improvements and modifications which become apparent to persons of ordinary skill in the art after reading the present disclosure and appended drawings are deemed within the spirit and scope of the present application.

What is claimed is:

1. A method for generating a digital certificate of an entity, comprising:
   generating, at the entity, a certificate signing request, the certificate signing request having at least public key information of the entity and identification information of the entity;
   combining verification information with the generated certificate signing request;
   transmitting, from the entity, the combination of the certificate signing request and the verification information;
   receiving, at a certification authority, the combination of the certificate signing request and the verification information from the entity;
   transmitting the combination of the certificate signing request and the verification information to a registration authority;
   extracting, at the registration authority, the verification information from the combination of the certificate signing request and the verification information;
   processing, at the registration authority, the information of the certificate signing request and the extracted verification information;
   determining whether to approve the certificate signing request based on a result of the processing;
   transmitting an approval to the certification authority when the certificate signing request is approved;

generating a certificate associated with the entity when the approval is received by the certification authority; and transmitting the certificate to the entity, wherein the verification information includes at least one of shared secret information, network address information, device identification information, or location information, wherein the combining the verification information with the generated certificate signing request is performed by embedding at least one of said shared secret information, network address information, device identification information, or location information within a network transmission protocol wrapper of the certificate signing request before the transmitting the combination of the certificate signing request and the verification information to the certificate authority, and wherein the verification information is selected based on a determination of sufficiency of the verification information in accordance with a predetermined criteria.

2. The method of claim 1, wherein the identification information of the entity includes at least one of name information of the entity, address information of the entity, telephone number information of the entity, electronic mail address information of the entity, or biometric information of the entity.

3. The method of claim 1, wherein the generating includes embedding the public key information and the identification information in the certificate.

4. The method of claim 1, wherein the processing includes comparing the verification information with stored verification information.

5. The method of claim 1, wherein the shared secret information includes at least one of password information, passphrase information, biometric information, or random number information.

6. The method of claim 1, wherein the information embedded in the network transmission protocol wrapper includes at least one of UDP IP network information, Rendezvous network information, IPv6 network information, Bluetooth communication information, IR communication information, RFID communication information, X.25 address information, cellular phone number information, USB device information, or peripheral device information.

7. The method of claim 1, wherein the network address information includes at least one of information of a network address of the entity used to transmit the certificate signing request or domain name information retrieved through reverse lookup of the network address information.

8. The method of claim 1, wherein the device identification information includes identification information of at least one of a device, a firewall, or a software application used by the entity to transmit the certificate signing request.

9. The method of claim 1, wherein the location information includes information of a location of the entity used to transmit the certificate signing request.

10. A method for generating a digital certificate, comprising:

generating, at the entity, a certificate signing request, the certificate signing request having at least public key information of the entity and identification information of the entity;

combining verification information with the generated certificate signing request;

transmitting, from the entity, the combination of the certificate signing request and the verification information;

receiving, at a certification authority, the combination of the certificate signing request and the verification information from an entity;

transmitting the combination of the certificate signing request and the verification information to a registration authority;

extracting, at the registration authority, the verification information from the combination of the certificate signing request and the verification information;

receiving an approval from the registration authority based on processing the information of the certificate signing request and the extracted verification information;

generating a certificate associated with the entity when the approval is received; and transmitting the generated certificate to the entity, wherein the verification information includes at least one of shared secret information, network address information, device identification information, or location information, wherein the combining the verification information with the generated certificate signing request is performed by embedding at least one of said shared secret information, network address information, device identification information, or location information within a network transmission protocol wrapper of the certificate signing request before the transmitting the combination of the certificate signing request and the verification information to the certificate authority, and wherein the verification information is selected based on a determination of sufficiency of the verification information in accordance with a predetermined criteria.

11. The method of claim 10, wherein the identification information of the entity includes at least one of name information of the entity, address information of the entity, telephone number information of the entity, electronic mail address information of the entity, or biometric information of the entity.

12. The method of claim 10, wherein the generating includes embedding the public key information and the identification information into the certificate.

13. The method of claim 10, wherein the shared secret information includes at least one of password information, passphrase information, biometric information, or random number information.

14. The method of claim 10, wherein the information embedded in the network transmission protocol wrapper includes at least one of UDP IP network information, Rendezvous network information, IPv6 network information, Bluetooth communication information, IR communication information, RFID communication information, X.25 address information, cellular phone number information, USB device information, or peripheral device information.

15. The method of claim 10, wherein the network address information includes at least one of information of a network address of the entity used to transmit the certificate signing request or domain name information retrieved through reverse lookup of the network address information.

16. The method of claim 10, wherein the device identification information includes identification information of at least one of a device, a firewall, or a software application used by the entity to transmit the certificate signing request.

17. The method of claim 10, wherein the location information includes information of a location of the entity used to transmit the certificate signing request.

18. A method for approving a digital certificate signing request of an entity, comprising:

generating, at the entity, a certificate signing request, the certificate signing request having at least public key information of the entity and identification information of the entity;

combining verification information with the generated certificate signing request;

transmitting, from the entity, the combination of the certificate signing request and the verification information;

receiving, at a registration authority, the combination of the certificate signing request and the verification information of the entity from a certification authority;

extracting, at the registration authority, the verification information from the combination of the certificate signing request and the verification information;

processing the information of the certificate signing request and the extracted verification information;

determining whether to approve the certificate signing request based on a result of the processing; and transmitting an approval to the certification authority when the certificate signing request is approved, wherein the verification information includes at least one of shared secret information, network address information, device identification information, or location information, wherein the combining the verification information with the generated certificate signing request is performed by embedding at least one of said shared secret information, network address information, device identification information, or location information within a network transmission protocol wrapper of the certificate signing request before the transmitting the combination of the certificate signing request and the verification information, and wherein the verification information is selected based on a determination of sufficiency of the verification information in accordance with a predetermined criteria.

19. The method of claim 18, wherein the identification information of the entity includes at least one of name information of the entity, address information of the entity, telephone number information of the entity, electronic mail address information of the entity, or biometric information of the entity.

20. The method of claim 18, wherein the processing includes comparing the verification information with stored verification information.

21. The method of claim 18, wherein the shared secret information includes at least one of password information, passphrase information, biometric information, or random number information.

22. The method of claim 18, wherein the information embedded in the network transmission protocol wrapper includes at least one of UDP IP network information, Rendezvous network information, IPv6 network information, Bluetooth communication information, IR communication information, RFID communication information, X.25 address information, cellular phone number information, USB device information, or peripheral device information.

23. The method of claim 18, wherein the network address information includes at least one of information of a network address of the entity used to transmit the certificate signing request or domain name information retrieved through reverse lookup of the network address information.

24. The method of claim 18, wherein the device identification information includes identification information of at least one of a device, a firewall, or a software application used by the entity to transmit the certificate signing request.

25. The method of claim 18, wherein the location information includes information of a location of the entity used to transmit the certificate signing request.

26. A method for obtaining a certificate associated with an entity, comprising:

providing identification information of the entity;

generating key information, the key information including private key information and public key information;

storing the private key information;

generating a certificate signing request, the certificate signing request including at least the public key information and the identification information of the entity;

combining verification information with the generated certificate signing request;

transmitting the combination of the verification information and the generated certificate request to a certificate authority;

extracting the verification information from the combination of the certificate signing request and the verification information; and receiving a signed certificate, wherein the verification information includes at least one of shared secret information, network address information, device identification information, or location information, wherein the combining the verification information with the generated certificate signing request is performed by embedding at least one of said shared secret information, network address information, device identification information, or location information within a network transmission protocol wrapper of the certificate signing request before the transmitting the combination of the verification information and the generated certificate signing request, and wherein the verification information is selected based on a determination of sufficiency of the verification information in accordance with a predetermined criteria.

27. The method of claim 26, wherein the identification information of the entity includes at least one of name information of the entity, address information of the entity, telephone number information of the entity, electronic mail address information of the entity, or biometric information of the entity.

28. The method of claim 26, wherein the generating key information includes generating random number information; and processing the random number information using a key pair generation function.

29. The method of claim 26, wherein the shared secret information includes at least one of password information, passphrase information, biometric information, or random number information.

30. The method of claim 26, wherein the information embedded in the network transmission protocol wrapper includes at least one of UDP IP network information, Rendezvous network information, IPv6 network information, Bluetooth communication information, IR communication information, RFID communication information, X.25 address information, cellular phone number information, USB device information, or peripheral device information.

31. The method of claim 26, wherein the network address information includes at least one of information of a network address of the entity used to transmit the certificate signing request or domain name information retrieved through reverse lookup of the network address information.

32. The method of claim 26, wherein the device identification information includes identification information of at least one of a device, a firewall, or a software application used by the entity to transmit the certificate signing request.

33. The method of claim 26, wherein the location information includes information of a location of the entity used to transmit the certificate signing request.

* * * * *